United States Patent [19]

Yamaguchi et al.

[11] Patent Number: 5,011,556

[45] Date of Patent: Apr. 30, 1991

[54] PROCESS FOR THE PRODUCTION OF POLYVINYLIDENE FLUORIDE LAMINATED PRODUCT

[75] Inventors: Takashi Yamaguchi, Yokkaichi; Tadahiko Tsutsumi, Suzuka; Toshie Watanabe, Sendai, all of Japan

[73] Assignee: Japan Synthetic Rubber Co., Ltd., Tokyo, Japan

[21] Appl. No.: 394,968

[22] Filed: Aug. 17, 1989

[51] Int. Cl.$^5$ ............................................. B32B 31/02
[52] U.S. Cl. .................................. 156/83; 156/307.3; 156/309.3; 156/327; 428/421
[58] Field of Search .................. 156/83, 327, 307.3, 156/309.3; 428/421

[56] References Cited

U.S. PATENT DOCUMENTS 4,659,625  4/1987  Decroly et al. .................... 428/421

FOREIGN PATENT DOCUMENTS 60-30335   2/1985  Japan.
60-52336   3/1985  Japan.
63-205217  8/1988  Japan.

*Primary Examiner*—John J. Gallagher
*Attorney, Agent, or Firm*—Oblon, Spivak, McClelland, Maier & Neustadt

[57] ABSTRACT

A process for producing a laminated product of a polyvinylidene fluoride layer and a rubber-like polymer layer is disclosed. In the process, an adhesive containing (a) a rubber-like polymer, (b) an oxide or hydroxide of a metal belonging to Groups II to IV of the Periodic Table, and (c) an organic solvent is applied to the surface of the polyvinylidene fluoride layer, the rubber-like polymer layer, or the both, and the layers are pressed together under heating at a temperature not higher than the melting point of the polyvinylidene fluoride. The laminated product is suitable for applications requiring high performance, e.g. as lining materials for chemical storage tanks, tanks on tank trucks, various types of hoses such as fuel hoses, various types of diaphragms and packing.

9 Claims, No Drawings

PROCESS FOR THE PRODUCTION OF POLYVINYLIDENE FLUORIDE LAMINATED PRODUCT

BACKGROUND OF THE INVENTION

1. Field of the Invention

The present invention relates to a process for the production of a laminated product from a polyvinylidene fluoride.

2. Description of the Background

Polyinylidene fluoride has been attracting considerable attention as highly functional plastics with superior resistance to chemicals, resistance to heat, weather resistance, and capability of preventing staining. Utilizing these superior characteristics, experiments have been conducted in applying these resins as anticorrosion lining materials for use with various types of chemicals. However, because polyvinylidene fluoride has poor flexibility and is chemically stable, adhesion between polyvinylidene fluoride and the metals used to fabricate tanks is poor so they are considered to be unsuitable for tank linings.

Accordingly, there is a strong demand for a method for laminating these resins with nitrile rubber or the like which has superior capabilities for bonding to metals. A process for laminating polyvinylidene fluoride with rubber must be designed so as to improve inherently poor adherence capability of the polymer to rubber. One of the well known methods employs adhesion by vulcanization at a high temperature, equivalent to the melting point of the polyvinylidene fluoride or higher. In another method which is also well known, the surface of the polyvinylidene fluoride is first subjected to an activation treatment such as a corona discharge treatment or a sodium treatment and then adhered to the rubber via an adhesive under vulcanization.

The high temperature vulcanization method, however, produces a poor outside appearance, with bubbles and undulations appearing on the surface of the polyvinylidene fluoride, while a suitable adhesive which is resistant to heat and to steam has not yet been found for the latter method which uses an activated adhesive. For these reasons, a laminated product which can be practically used has not yet been produced.

In view of this situation, the inventors of the present invention have undertaken extensive studies in order to develop a method for manufacturing a laminated product which imparts superior adhesive strength between polyvinylidene fluoride and rubber and which is suitable for industrial applications. As a result, the inventors have found that such a laminated product can be obtained by a process using an adhesive which comprises a rubber-like polymer and specific types of material. Such a finding has led to the completion of the present invention.

SUMMARY OF THE INVENTION

Accordingly, an object of this invention is to provide a process for producing a laminated product of a polyvinylidene fluoride layer (A) and a rubber-like polymer layer (B) which comprises:

providing an adhesive containing (a) a rubber-like polymer, (b) one or more metal compounds selected from oxides and hydroxides of an element belonging to Groups II to IV of the Periodic Table, and (c) an organic solvent which is capable of dissolving or swelling said polyvinylidene fluoride layer (A), said rubber-like polymer layer (B), or the both, applying said adhesive to the surface of said polyvinylidene fluoride layer (A), said rubber-like polymer layer (B), or the both, and pressing said polyvinylidene fluoride layer (A) and said rubber-like polymer layer (B) together to adhere at a temperature not higher than the melting point of said polyvinylidene fluoride.

Other and further objects, features and advantages of the invention will appear more fully from the following description.

DETAILED DESCRIPTION OF THE INVENTION AND PREFERRED EMBODIMENTS

As the polyvinylidene fluoride of the (A) layer used in the present invention, not only homopolymers of vinylidene fluoride but also copolymers of vinylidene fluoride of a content of 50 mol % or greater, and preferably 70 mol % or greater, can be used. In addition, a blend polymer which is a combination of homopolymers or copolymers of vinylidene fluoride and an polyacrylate such as polymethacrylate or the like and which contains 75 wt % or more of vinylidene fluoride is acceptable.

Examples of the rubber-like polymer of the (B) layer used in the present invention are diene-type rubbers such as butadiene rubber, styrene-butadiene rubber (SBR), nitrile rubber, chloroprene rubber, and the like; and non-diene-type rubbers, such as ethylene-propylene rubber (EPR), ethylene-propylene non-conjugated diene rubber (EPDM), butyl rubber, acrylic rubber, fluororubber, and the like.

Examples which can be given of nitrile rubber are copolymer rubbers of an unsaturated nitrile compound such as acrylonitrile, methacrylonitrile, or the like, and a conjugate diene such as butadiene, isoprene, and the like; copolymer rubbers comprising three or more components, e.g., comprising said copolymer rubber components plus acrylic acid or methacrylic acid alkyl ester components; and modified unsaturated nitrile-conjugate diene rubbers which have at least one type of functional group selected from amino group, epoxy group, and carboxyl group. The modified unsaturated nitrile-conjugate diene rubbers are obtained by adding to an unsaturated nitrile and a conjugate diene a monomer having an amino group, epoxy group, and/or carboxyl group which can be copolymerized with the unsaturated nitrile or the conjugate diene. For nitrile rubber, the content of combined acrylonitrile is 10 to 50 wt %, and a particularly desirable content is 35 wt % or greater.

Ethylene-propylene-non-conjugate diene rubbers which can be used in the present invention include those nonconjugate diene rubbers comprising, in addition to ethylene and propylene, one or more non-conjugate dienes such as ethylidenenorbornene, cyclopentadiene, 1,4-hexadiene, methylenenorbornene, 4,7,8,9-tetrahydroindene, and the like.

Of the (B) layer rubber-like polymers, nitrile rubbers, butyl rubbers, or blends of other rubbers containing 30 wt % or more of nitrile or butyl rubbers are desirable.

Given as desirable rubbers which can be blended are EPR, EPDM, SBR, butadiene rubber, natural rubber, acrylic rubber, fluororubber, butyl rubber, chloroprene rubber, silicone rubber, chlorosulphonated polyethylene, and the like.

Additives normally used in rubbers, such as fillers, softeners, valcanizing agents, plasticizers, dispersants, activators, tackifiers, colorants, antioxidants, and other additives can be blended into the rubber-like polymer layer (B).

These blending materials are kneaded together using a normal kneading machine, such as a rolling machine, Banbury mixer, or the like, and then can be formed and vulcanized under normal production conditions for vulcanizing rubber.

Polar rubbers such as nitrile rubber, chloroprene rubber, acrylic rubber, halogenated polyethylene, fluororubber, chlorosulphonated polyethylene, and the like are desirable as the rubber-like polymers used as components of the adhesive used in the present invention to promote the adhesive strength of the (A) and (B) layers. Particularly desirable components are nitrile rubber, chloroprene rubber, acrylic rubber, and the like, with nitrile rubber being the most desirable.

Various types of normal rubber additives can be blended into these rubber-like polymers.

As metal compounds used in the present invention, the elements belonging to Groups II to IV of the Periodic Table are, more precisely, the elements belonging to the Groups IIa, IIb, IIIa, IIIb, IVa, and IVb in the Periodic Table. Among these elements, the desirable elements for the oxides and hydroxides used in the present invention are elements belonging to the Groups IIa, IIIa, and IVa, in the Periodic Table. Particularly desirable oxides and hydroxides are those of Mg, Ca, Al, Si, and Pb. In particular, silicon dioxide, magnesium oxide, lead oxide, aluminum hydroxide, and calcium hydroxide are desirable. Among these, the most suitable for increasing the adhesive strengths of the (A) and (B) layers are silicon dioxide, magnesium oxide, and lead oxide. One type, or two or more types of these oxides and hydroxides together can be used.

Organic solvents which can be used are various types of ketones, amides, amines, halogenated alkyls, aliphatic esters, and ethers. A desirable solvent is that which can dissolve or swell the polyvinylidene fluoride layer (A), the rubber-like polymer layer (B), or the both. For example, ketones, amides, and the like are desirable, and even more desirable are ketones such as methyl ethyl ketone and acetone.

The desirable ratio for blending the rubber-like polymer and the organic solvent is 5 to 70 parts by weight to 95 to 30 parts by weight respectively. Even more desirable is 5 to 60 parts by weight to 95 to 40 parts by weight, while particularly desirable ratio is 7 to 50 parts by weight to 93 to 50 parts by weight, and most desirable, 10 to 30 parts by weight to 90 to 70 parts by weight.

If there are less than 5 parts by weight of the rubber-like polymer, the organic solvent volatilizes too quickly and the effect of dissolving or swelling the polyvinylidene fluoride layer is slight, and, in addition, the adhesive tends to be non-uniform when it is applied, so that the effect of increasing the adhesive strength is low.

Also, if the parts by weight of this polymer are greater than 70, the viscosity increases to a high level so that it is difficult to apply the adhesive. In addition, since the organic solvent volatilize only insufficiently, the adhesion strength tends to become uneven, and lenticulation and bubbles on the outside of the laminated product are easily produced. If no organic solvent is used, sufficient adhesive strength cannot be obtained.

The desirable ratio for blending the rubber-like polymer and the metal compound are 100 parts by weight versus 1 to 100 parts by weight respectively. Even more desirable are 100 parts by weight versus 5 to 80 parts by weight, while particularly desirable ratios are 100 parts by weight versus 10 to 60 parts by weight.

There are no particular restrictions as to the method of applying the adhesive layer between the (A) layer and the (B) layer. Preferable methods are (1) a method of coating an adhesive layer by rolling, brushing, or spraying the adhesive composition onto the vinyliden fluoride resin layer (A) or the rubber-like polymer layer (B), and (2) a method of coating adhesive layers by applying the adhesive composition to both the vinyliden fluoride resin layer (A) and the rubber-like polymer layer (B). Of these, method (1) is preferable. Particularly from the aspect of effectively promoting the adhesive strength, the application of the adhesive on the (A) layer is preferable.

The amount of adhesive composition applied is 10 gm/m$^2$ or greater, in the case of method (1) and when the adhesive composition is applied to the vinylidene fluoride plastic layer (A), for example. Following this, after 50 wt % or more, preferably 80 wt % or more, of the organic solvent in the adhesive composition is allowed to volatilize off, the rubber-like polymer layer is placed on to form a lamination.

The lamination of the polyvinylidene fluoride layer (A) and the rubber-like polymer layer (B) is performed preferably by heating and pressing the two layers to adhere each other. A desirable heating temperature range is below the melting point of the polyvinylidene fluoride, but preferably no more than 30° C. below the melting point (Tm° C.), more desirably, at a temperature no more than 20° C. below Tm° C., and most desirably no more than 15° C. below Tm° C. If the laminating temperature is too low, the adhesive strength is inadequate. Also, if the temperature is higher than the melting point, deformation, lenticulation, and bubbles are produced on the polyvinylidene fluoride layer, worsening its appearance.

The rubber-like polymer layer (B) can be an unvulcanized or a vulcanized rubber, but from the aspect of adhesive strength and workability, a composition which is a mixture of unvulcanized rubber and vulcanizing agent is used, and it is desirable that the vulcanizing be performed immediately before, after, or during the period of lamination by heating and pressing.

As a vulcanizing agent, sulfur, peroxide, or the like can be used. The amount of the vulcanizing agent used may be the same as for the vulcanization of ordinary rubber. For example, for sulfur, in 100 parts by weight of the rubber the amount used is 0.1 to 7 parts by weight, and preferably 0.3 to 5 parts by weight. For peroxide, for 100 parts by weight of the rubber the amount used is 0.01 to 5 parts by weight, and preferably 0.05 to 3 parts by weight.

There are no particular limitations as to the pressure applied to the laminate, but 0.1 to 50 kg/cm$^2$ is desirable, with 0.2 to 20 kg/cm$^2$ being more desirable.

The polyvinylidene fluoride laminated product obtained by the method of the present invention has the both superior chemical resistance, heat resistance, weather resistance, and staining resistance which are inherent to vinylidene fluoride, and the flexibility and a superior ability to adhere to metals possessed by the rubber-like polymer. Because the layers adhere firmly, it is possible to utilize this material in various applications which require these characteristics.

For example, it can be used for various types of formed products, industrial parts, automotive parts, recreation products, miscellaneous goods, and the like, as well as for corrosive resistant lining materials for storage tanks for various types of chemicals, tanks on tank trucks, hoppers, and the like, various types of hoses such as fuel hoses, tubes, various types of diaphragms, packing, and the like.

Other features of the invention will become apparent in the course of the following description of the exemplary embodiments which are given for illustration of the invention and are not intended to be limiting thereof.

EXAMPLES

In the examples below "parts" refers to parts by weight and percentages are percent by weight.

Materials and Procedures

A : Types of polyvinylidene fluoride layer (A)

Extruded sheets of 1 mm thickness of the plastics shown below were used:
1. KYNAR 460 (trade name, polyvinylidene fluoride manufactured by Pennwart Corp.)
2. KYNAR 1120 (trade name, polyvinylidene fluoride/polymethylmethacrylate mixture manufactured by Pennwart Corp.)
3. KYNAR 2800 (trade name, vinylidene fluoride and hexafluoro propylene copolymer manufactured by Pennault Co.)

B: Preparation of the rubber-like polymer layer (B)

B-1 : Nitrile rubber (NBR), silicon dioxide, carbon black, and other rubber chemicals according to the composition shown below were kneaded by a rolling machine to prepare a 1 mm thick rubber sheet.

| (Composition) | |
|---|---|
| NBR N 220S* | 100 (Parts) |
| Zinc oxide | 5 |
| Stearic acid | 1 |
| SRF carbon black | 30 |
| Precipitated silica | 10 |
| Dioctyl phthalate (DOP) | 10 |
| Vulcanization accelerator CZ | 2 |
| Vulcanization accelerator TT | 1.5 |
| Sulfur | 0.5 |

*Tradename, product of Japan Synthetic Rubber Co. Ltd.

B-2 : The same 1 mm thick rubber sheet as B-1 was prepared according to the same manner using the same composition as above, except that butyl rubber IIR (BUTYL 365: trade name, product of Japan Synthetic Rubber Co. Ltd.) was substituted for NBR.

C : Preparation of the adhesive composition

C-1 : NBR was used as the rubber-like polymer, and silicon dioxide ($SiO_2$) as the metal compound, with other components according to the composition shown below. The mixture was kneaded by a rolling machine, then the resulting material was mixed with an organic solvent, methyl ethyl ketone (MEK), to give an adhesive composition containing 30% rubber-like polymer.

| (Composition) | |
|---|---|
| NBR N 220S* | 100 (Parts) |
| Silicon dioxide** | 30 |
| Zinc oxide | 5 |
| SFR carbon black | 5 |
| Vulcanization accelerator CZ | 2 |
| Vulcanization accelerator TT | 1.5 |
| Sulfur | 0.5 |

*Tradename, product of Japan Synthetic Rubber Co. Ltd.
**NIPSEAL VN3 (tradename, product of Japan Silica Co. Ltd.)

C-2 : An adhesive was produced in the same manners as C-1 except that the amount of rubber-like polymer in the adhesive was 10%.

C-3 : An adhesive was produced in the same manners as C-1 except that 50 parts by weight of silicon disoxide was used. The amount of rubber-like polymer was 30%.

C-4 : An adhesive was produced in the same manners as C-1 except that acrylic rubber (AR 101: trade name, product of Japan Synthetic Rubber Co. Ltd.) was used instead of NBR.

C-5 : An adhesive was produced in the same manners as C-1 except that magnesium oxide (KYOWA MAG 30: trade name, product of Kyowa Chemical Co. Ltd.) was used instead of silicon dioxide.

C-6 : An adhesive was produced in the same manners as C-1 except that dimethyl acetamide (DMA) was used instead of MEK.

D : Laminating conditions

The adhesive obtained in C above was applied to the polyvinylidene fluoride layer (A) using a brush in an amount of 100 gm/m² and dried at room temperature for at least 24 hours.

The sheet of rubber-like polymer (B) obtained in B above was pasted to the surface of the sheet obtained in this manner on which the adhesive had been applied, and, using a press machine, pressure of about 7 kg/cm² was applied for 10 minutes at a temperature 5° C. lower than the melting point of the polyvinylidene fluoride to form a lamination.

EXAMPLES 1-9

The combinations of the polyvinylidene fluoride layer (A), the rubber-like polymer (B), and the adhesive, by which laminated products according to the procedures outlined above were produced, are listed in Table 1. Notwithstanding the above, in Example 3 the vulcanization temperature in the lamination conditions was 20° C. lower than the melting point of the polyvinylidene fluoride, and vulcanization was performed for 10 minutes to form the lamination.

Comparative Example 1

The laminate of this example was prepared in the same way as for Example 1 with the exception that the use of the adhesive composition was omitted.

Comparative Example 2

The laminate of this example was prepared in the same way as for Example 1 with the exception that only the solvent MEK was used in the adhesive composition.

Comparative Example 3

The laminate of this example was prepared in the same way as for Example No. 1 with the exception that the metal oxide in the adhesive composition was omitted.

Comparative Example 4

The laminate of this example was prepared in the same way as for Example 1 without using the organic solvent. The adhesive composition was formed as a sheet of 1 mm thickness.

Comparative Example 5

The laminate of this example was prepared in the same way as for Example 1 with the exception that the lamination was performed at 125° C.

Comparative Example 6

The laminate of this example was prepared in the same way as for Example 1 with the exception that the lamination was performed at 175° C.

Evaluation Method (1) Measurement of adhesive strength

A sample sheet measuring 25 mm in width and 100 mm in length was cut out of the resulting laminated sheets and about a 30 mm length of the interface of the polyvinylidene fluoride layer (A) and the rubber-like polymer layer (B) was forcibly peeled with a knife.

Using an Autograph IS-2000 (trade name, a tension tester manufactured by Shimadzu Corp), the layers (A) and (B) were clamped and stretched in a chuck in 180° opposed directions, and the adhesive strength between the laminated layers was measured (peeling speed 50 mm/min, at room temperature).

(2) External appearance

The surface of the polyvinylidene fluoride layer of the laminated sheet was examined visually for smoothness, bubbles, lenticulation, and the like.

The results of the evaluation are given in Table 2.

TABLE 1

| Materials | Examples | | | | | | | | |
|---|---|---|---|---|---|---|---|---|---|
| | 1 | 2 | 3 | 4 | 5 | 6 | 7 | 8 | 9 |
| Polyinylidene fluoride layer (A) | KYNAR 460 | KYNAR 460 | KYNAR 460 | KYNAR 460 | KYNAR 2800 | KYNAR 1120 | KYNAR 460 | KYNAR 460 | KYNAR 460 |
| Rubber-like polymer layer (B) | B-1 (NBR) | B-1 (NBR) | B-1 (NBR) | B-1 (NBR) | B-1 (NBR) | B-1 (NBR) | B-2 (IIR) | B-1 (NBR) | B-1 (NBR) |
| Adhesive composition | C-1 | C-2 | C-1 | C-3 | C-1 | C-4 | C-1 | C-5 | C-6 |
| Type of rubber | NBR | NBR | NBR | NBR | NBR | AR | NBR | NBR | NBR |
| Metallic compound | $SiO_2$ | $SiO_2$ | $SiO_2$ | $SiO_2$ | $SiO_2$ | $SiO_2$ | $SiO_2$ | MgO | $SiO_2$ |
| Amount of metal compound (%) | 30 | 30 | 30 | 50 | 30 | 30 | 30 | 30 | 30 |
| Solvent | MEK | MEK | MEK | MEK | MEK | MEK | MEK | MEK | DMA |
| Rubber/Solvent Ratio | 30/70 | 10/30 | 30/70 | 30/70 | 30/70 | 30/70 | 30/70 | 30/70 | 30/70 |
| Lamination/valcanization temperature (°C.) | 155 | 155 | 140 | 155 | 135 | 155 | 155 | 155 | 155 |
| Adhesive Strength (kgf/25 mm) | 11.2 | 11.0 | 9.5 | 13.0 | 12.5 | 10.5 | 11.0 | 9.0 | 12.0 |
| Appearance | Good | Good | Good | Good | Good | Good | Good | Good | Good |

| Materials | Comparative Examples | | | | | |
|---|---|---|---|---|---|---|
| | 1 | 2 | 3 | 4 | 5 | 6 |
| Polyinylidene fluoride layer (A) | KYNAR 460 | KYNAR 460 | KYNAR 460 | KYNAR 460 | KYNAR 460 | KYNAR 460 |
| Rubber-like polymer layer (B) | B-1 (NBR) | B-1 (NBR) | B-1 (NBR) | B-1 (NBR) | B-1 (NBR) | B-1 (NBR) |
| Adhesive composition | — | — | — | — | C-1 | C-1 |
| Type of rubber | — | — | NBR | NBR | NBR | NBR |
| Metallic compound | — | — | — | $SiO_2$ | $SiO_2$ | $SiO_2$ |
| Amount of metal compound (%) | — | — | — | 50 | 30 | 30 |
| Solvent | — | MEK | MEK | — | MEK | MEK |
| Rubber/Solvent Ratio | — | — | 30/70 | — | 30/70 | 30/70 |
| Lamination/valcanization temperature (°C.) | 155 | 155 | 155 | 155 | 125 | 175 |
| Adhesive Strength (kgf/25 mm) | 4.0 | 4.2 | 2.0 | 4.0 | 2.5 | 15.0 |
| Appearance | Good | Good | Good | Good | Good | Buuble Lenticulation |

The following conclusions can be drawn from the results shown in Table 2.

The adhesive characteristics between the laminations of the laminated product of the present invention of Example 1-9 are seen to be superior.

The adhesive strength of the laminated sheets in Comparative Examples 1 and 2 in which no adhesive was used is extremely low. Where a solvent only was applied there was no effect.

In Comparative Example 3 in which no metal oxide was used in the adhesive composition, it is seen that almost no adhesive strength was obtained.

In Comparative Example 4 in which the solvent component was omitted from the adhesive composition, only a low adhesive strength was obtained.

In Comparative Example 5 the heating conditions were outside the range of the present invention, 40° C. below the melting point of the polyvinylidene fluoride. Some adhesion was obtained but there was no effective adhesive strength.

In Comparative Example 6 the laminating temperature was greater than the melting point of the polyvinylidene fluoride so that, while the adhesive strength was good, there were defects in the outer appearance of the laminated sheet, therefore it cannot be applied to practical use.

By the method for manufacturing a laminated product from a polyvinylidene fluoride of the present invention, the polyvinylidene fluoride layer (A) and the rubber-like polymer layer (B) are firmly adhere through an adhesive layer.

As discuussed above, because conventional polyvinylidene fluorides show unsatisfactory flexibility and poor adhesive strength, they cannot be used in practical applications which require superior cemical resistance, heat resistance, weather resistance, and staining resistance. Also, although this material has been laminated to a rubber material to provide flexibility and to improve the adhesive characteristics, adequate adhesive strength was not obtained. A suitable adhesive was not found and a resistant laminated product was not produced in practice.

The laminated product produced by means of the present invention overcomes these deficiencies.

The laminated product obtained in this manner is suitable for applications which require high performance, particularly in applications as lining materials for various types of industrial storage tanks, tanks on tank trucks, various types of hoses such as fuel hoses, various types of diaphragms, packing, and the like. It has extremely high value in industrial applications.

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing a laminated product of a polyvinylidene fluoride layer (A) and a rubber-like polymer layer (B) which comprises:

providing an adhesive containing (a) a rubber-like polymer, (b) one or more metal compounds selected from oxides and hydroxides of an element belonging to Groups II to IV of the Periodic Table, and (c) an organic solvent which is capable of dissolving or swelling said polyvinylidene fluoride layer (A), said rubber-like polymer layer (B), or both, applying said adhesive to the surface of said polyvinylidene fluoride layer (A), said rubber-like polymer layer (B), or both and pressing said polyvinylidene fluoride layer (A) and said rubber-like polymer layer (B) together to adhere them at a temperature not higher than the melting point of said polyvinylidene fluoride.

2. A process according to claim 1, wherein said rubber-like polymer (a) which is a component of said adhesive is a polar rubber.

3. A process according to claim 2, wherein said rubber-like polymer (a) which is a component of said adhesive is one or more rubber-like polymers selected from the group consisting of nitrile rubber, chloroprene rubber, acryl rubber, fluororubber, and chlorosulfonated polyethylene.

4. A process according to of claim 1, wherein said metal compound (b) which is a component of said adhesive is at least one metal compound selected from the group consisting of silicon dioxide, magnesium oxide, and lead oxide.

5. A process according to of claim 1, wherein said adhesive is applied to the resin layer (A).

6. A process according to of claim 1, wherein the adhesion is performed by means of pressing under heating.

7. A process according to claim 1, wherein the adhesion is performed at a temperature which is no more than 30° C. below the melting point of the plastic layer (A).

8. A process according to claim 1, wherein the rubber-like polymer resin layer (B) is a composition comprising a vulcanizing agent.

9. A process according to of claim 1, wherein the adhesive composition contains 40 to 95 parts by weight of the organic solvent to 60 to 5 parts by weight of the rubber-like polymer, and 1 to 100 parts by weight of the metal compound to 100 parts by weight of the rubber-like polymer.

* * * * *